United States Patent
Karczewicz et al.

(10) Patent No.: US 10,440,399 B2
(45) Date of Patent: Oct. 8, 2019

(54) CODING SIGN INFORMATION OF VIDEO DATA

(71) Applicant: QUALCOMM Incorporated, San Diego, CA (US)

(72) Inventors: Marta Karczewicz, San Diego, CA (US); Li Zhang, San Diego, CA (US); Jianle Chen, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/348,686

(22) Filed: Nov. 10, 2016

(65) Prior Publication Data

US 2017/0142448 A1    May 18, 2017

Related U.S. Application Data

(60) Provisional application No. 62/255,206, filed on Nov. 13, 2015.

(51) Int. Cl.
| | |
|---|---|
| *H04N 7/12* | (2006.01) |
| *H04N 11/02* | (2006.01) |
| *H04N 11/04* | (2006.01) |
| *H04N 19/91* | (2014.01) |
| *H04N 19/44* | (2014.01) |
| *H04N 19/60* | (2014.01) |
| *H04N 19/13* | (2014.01) |
| *H04N 19/61* | (2014.01) |
| *H04N 19/593* | (2014.01) |
| *H04N 19/157* | (2014.01) |

(Continued)

(52) U.S. Cl.
CPC ............. *H04N 19/91* (2014.11); *H04N 19/13* (2014.11); *H04N 19/157* (2014.11); *H04N 19/18* (2014.11); *H04N 19/44* (2014.11); *H04N 19/593* (2014.11); *H04N 19/60* (2014.11); *H04N 19/61* (2014.11); *H04N 19/105* (2014.11); *H04N 19/11* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 2009/0232204 A1* | 9/2009 | Lee ...................... | H04N 19/176 375/240.02 |
| 2012/0121011 A1* | 5/2012 | Coban .................. | H04N 19/176 375/240.03 |

(Continued)

OTHER PUBLICATIONS

Second Written Opinion of International Application No. PCT/US2016/061616 dated Oct. 17, 2017, 14 pp.

(Continued)

*Primary Examiner* — Chikaodili E Anyikire
(74) *Attorney, Agent, or Firm* — Shumaker & Sieffert, P.A.

(57) ABSTRACT

An example device for decoding video data includes a memory configured to store video data and one or more processors implemented using digital logic circuitry, the processors configured to determine a context model for entropy decoding a value for a sign of a transform coefficient of a block of the video data based on one or more sign values of neighboring transform coefficients and entropy decode the value for the sign of the transform coefficient using the context model.

29 Claims, 11 Drawing Sheets

(51) Int. Cl.
*H04N 19/18* (2014.01)
*H04N 19/176* (2014.01)
*H04N 19/105* (2014.01)
*H04N 19/11* (2014.01)

(56) References Cited

U.S. PATENT DOCUMENTS

| | | | |
|---|---|---|---|
| 2012/0230417 A1 | 9/2012 | Sole et al. | |
| 2013/0003859 A1* | 1/2013 | Karczewicz | H04N 19/70 375/240.24 |
| 2013/0272424 A1 | 10/2013 | Sole et al. | |
| 2014/0003488 A1* | 1/2014 | Ji | H04N 19/70 375/240.02 |
| 2014/0003530 A1 | 1/2014 | Sole et al. | |
| 2014/0010278 A1* | 1/2014 | Lou | H04N 19/00066 375/240.02 |
| 2014/0140400 A1* | 5/2014 | George | H04N 19/52 375/240.12 |
| 2014/0307801 A1* | 10/2014 | Ikai | H04N 19/91 375/240.18 |
| 2015/0103918 A1* | 4/2015 | Wang | H04N 19/159 375/240.24 |
| 2015/0181237 A1* | 6/2015 | Tsukuba | H04N 19/44 382/233 |

OTHER PUBLICATIONS

Response to Written Opinion filed in International Application No. PCT/US2016/061616 dated Sep. 13, 2017 5 pp.
International Preliminary Report on Patentability issued in International Application No. PCT/US2016/061616 dated Jan. 29, 2018, 16 pp.
International Search Report and Written Opinion from International Application No. PCT/US2016/061616, dated Apr. 6, 2017, 25 pp.
Sole, et al.,"Parallel processing of residual data in HE", JCT-VC Meeting; MPEG Meeting; Jul. 14-22, 2011; Torino; (Joint Collaborative Team on Video Coding of ISO / IEC JTCI/SC29/WGII and ITU-T SG. 16 ) ; URL: http://wftp3.itu/av-arch/jctvc-site/, No. JCTVC-F552, Jul. 16, 2011, 6 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Invitation to Pay Additional Fees from International Application No. PCT/US2016/061616, dated Feb. 9, 2017, 11 pp.
Chen, et al., "Further improvements to HMKTA-1.0," ITU—Telecommunications Standardization Sector, Study Group, 52nd Meeting; Jun. 19-26, 2015, document No. VCEG-AZ07_v2, 9 pp.
"Transform Coding Using the Residual Quadtree (RQT)," Fraunhofer, retrieved on Aug. 26, from https://www.hhi.fraunhofer.de/en/departments/vca/research-groups/image-video-coding/research-topics/transform-coding-using-the-residual-quadtree-rqt.html, 4 pp.
Wang, et al., "High Efficiency Video Coding (HEVC) Defect Report," JCT-VC Meeting; (Joint Collaborative Team on Video Coding (JCT-VC) of ITU-T SG 16 WP 3 and ISO/IEC JTC 1/SC 29/WG 11); Jul. 25-Aug. 2, 2013; document: JCTVC-N1003_1; Sep. 27, 2013; 312 pp.
Bross, et al., High Efficiency Video Coding (HEVC) text specification draft 10 (for FIDS & Last Call); JCT-VC Meeting; (Joint Collaborative Team on Video Coding (JCT-VC) of ITU-T SG 16 WP 3 and ISO/IEC JTC 1/SC 29/WG 11); Jan. 14-23, 2013; No. JCTVC-L1030_v34; Mar. 19, 2013; 310 pp.
Chien, et al., "On coefficient level remaining coding," JCT-VC Meeting; (Joint Collaborative Team on Video Coding (JCT-VC) of ITU-T SG 16 WP 3 and ISO/IEC JTC 1/SC 29/WG 11); Apr. 27-May 7, 2012; document No. JCTVC-10487, May 7, 2012; 8 pp.
Karczewicz, et al., "RCE2: Results of Test 1 on Rice Parameter Initialization," JCT-VC Meeting; (Joint Collaborative Team on Video Coding (JCT-VC) of ITU-T SG 16 WP 3 and ISO/IEC JTC 1/SC 29/WG 11); Jan. 9-17, 2014; document No. JCTVC-P0199_r2, Jan. 15, 2014; 9 pp.
Sole, et al., "Transform Coefficient Coding in HEVC," IEEE Transactions on Circuits and Systems for Video Technology, vol. 22, No. 12, Dec. 2012, pp. 1765-1777.

* cited by examiner

CODING SIGN INFORMATION OF VIDEO DATA

This application claims the benefit of U.S. Provisional Application No. 62/255,206, filed Nov. 13, 2015, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265 High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding sign information of video data. To code a block of video data, a video coder codes prediction information and residual information. The prediction information represents a manner in which the block is to be predicted, while the residual information includes a residual block that represents pixel-by-pixel differences between the original version of the block and a prediction for the block. The residual information is coded in the form of quantized transform coefficients, where the residual block is transformed to form a block of transform coefficients in a transform domain, such as a frequency domain. In some examples, the residual block is directly quantized without transform, e.g., if the residual information is in a spatial domain. Separate elements of each transform coefficient, such as a magnitude or level of the transform coefficient (representing an absolute value of the transform coefficient) and a sign of the transform coefficient (whether the transform coefficient is positive or negative), are coded individually. This disclosure describes various techniques for coding the sign information, which may be used alone or together in any combination.

In one example, a method of decoding video data includes determining a context model for entropy decoding a value for a sign of a transform coefficient of a block of video data based on one or more sign values of neighboring transform coefficients, and entropy decoding the value for the sign of the transform coefficient using the context model.

In another example, a device for decoding video data includes a memory configured to store video data, and one or more processors implemented using digital logic circuitry, the processors configured to determine a context model for entropy decoding a value for a sign of a transform coefficient of a block of the video data based on one or more sign values of neighboring transform coefficients, and entropy decode the value for the sign of the transform coefficient using the context model.

In another example, a device for encoding video data includes means for determining a context model for entropy encoding a value for a sign of a transform coefficient of a block of video data based on one or more sign values of neighboring transform coefficients, and means for entropy encoding the value for the sign of the transform coefficient using the context model.

In another example, a computer-readable storage medium has stored thereon instructions that, when executed, cause a processor to determine one or more neighboring transform coefficients according to a template based on one or more sign values of neighboring transform coefficients, and determine the context model based on values for signs of the neighboring transform coefficients to the transform coefficient.

The details of one or more examples are set forth in the accompanying drawings and the description below. Other features, objects, and advantages will be apparent from the description and drawings, and from the claims.

DETAILED DESCRIPTION

Figure 1:
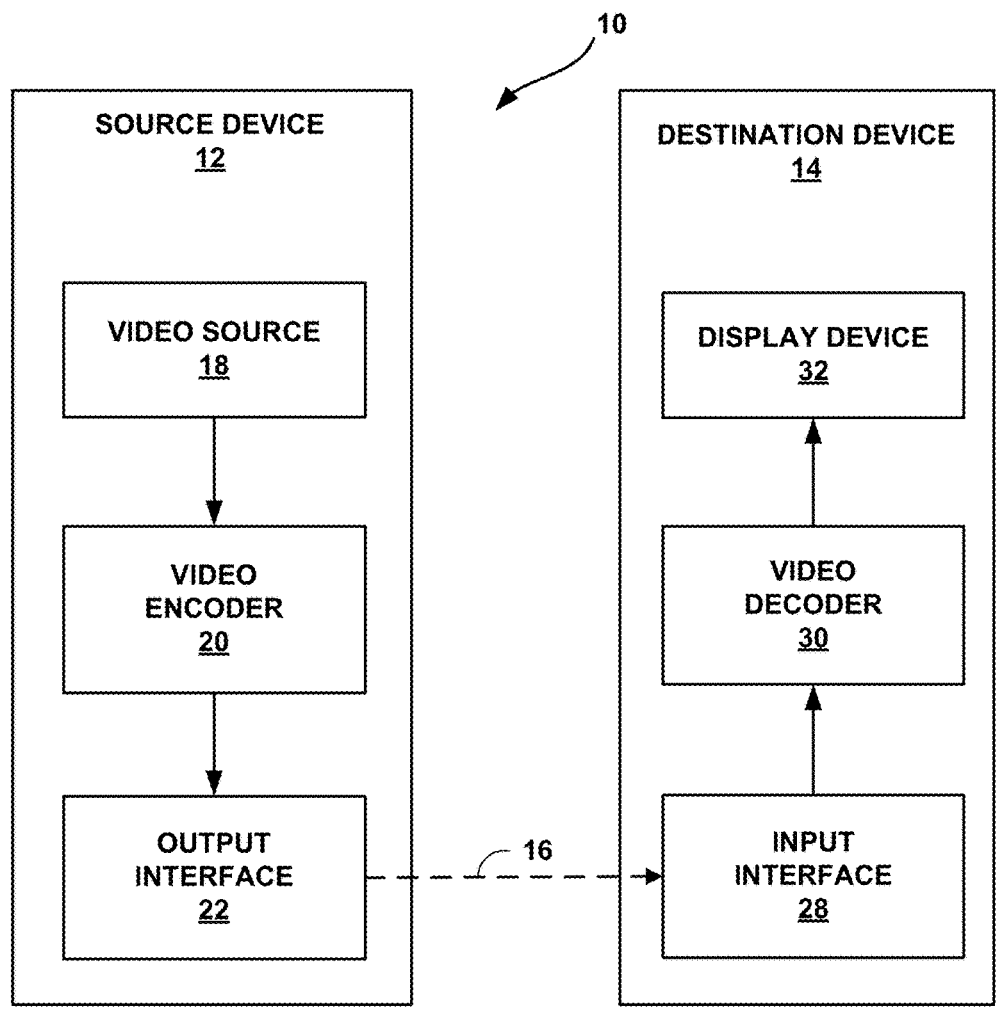
FIG. 1 is a block diagram illustrating an example video encoding and decoding system that may utilize techniques for coding sign information of video data.

This disclosure describes techniques related to entropy coding in block based hybrid video coding, especially for the coefficient level coding. These techniques may be applied to any of the existing video codecs, such as HEVC (High Efficiency Video Coding) or may be an efficient coding tool in any future video coding standards.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a video coding standard, namely High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). A version of the HEVC specification, referred to herein as the HEVC specification hereinafter, is available from phenix.int-evry.fr/jct/doc_end_user/documents/14_Vienna/wg11/JCTVC-N1003-v1.zip.

The HEVC specification has been published as International Telecommunication Union, "SERIES H: AUDIOVISUAL AND MULTIMEDIA SYSTEMS, Infrastructure of audiovisual services—Coding of moving video, High efficiency video coding," ITU-T H.265, April 2015.

In HEVC, the sign of each nonzero transform coefficient of a transform unit of video data is coded in a fourth scan pass in bypass mode. For each coding group (CG) of the transform unit, and depending on a criterion, encoding the sign of the last nonzero coefficient (in reverse scan order) is simply omitted when using sign data hiding (SDH). Instead, the sign value (0 for positive or 1 for negative) is embedded in the parity of the sum of the magnitudes of the CG using a predefined convention, denoted by $S_{CG}$: even corresponds to "+" and odd to "−." That is, the omitted sign value could be derived from ($S_{CG}$ % 2) wherein the '%' represents the modulo operation. The criterion to use SDH is the distance in scan order between the first and the last nonzero transform coefficients of the CG. If this distance is equal to or larger than 4, SDH is used. This value of 4 was chosen because it provides the largest gain on HEVC test sequences. At the encoder side, if one of the following cases happens, one of the transform coefficients should be modified:

the sum of magnitudes of the CG is odd, and the last non-zero coefficient (in reverse scan order) is positive the sum of magnitudes of the CG is even and the last non-zero coefficient (in reverse scan order) is negative In some instances, when the sign flag needs to be coded, bypass coding mode is used, according to HEVC. That is, the probability of the sign flag (set to either 0 or 1 depending on it is negative or positive) is assumed to be equal to 0.5. Therefore, fixed length coding (bypass coding) is applied to code the sign flags in HEVC and its extensions. However, this disclosure recognizes that there may indeed be some correlation between current sign information and that of neighboring coefficients.

Furthermore, in SDH, a video coder always checks the parity of the sum of transform coefficients in a coding group (denoted by $S_{CG}$), i.e., ($S_{CG}$ %2) to derive the omitted sign value, which may be sub-optimal without considering the local statistics of transform coefficients within a coding group.

This disclosure describes various techniques that may be performed alone or in any combination, which may overcome these and other issues with coding of sign information of video data.

FIG. 1 is a block diagram illustrating an example video encoding and decoding system 10 that may utilize techniques for coding sign information of video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding sign information of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding sign information of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder digital logic circuitry (e.g., fixed function or programmable digital logic circuitry), such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. A CTU is the largest coding unit in a slice. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. That is, a CTU includes a quadtree, the nodes of which are coding units. If a CU is split into four sub-CUs, the node corresponding to the CU includes four leaf nodes, each of which corresponds to one of the sub-CUs.

According to HEVC, the size of a CTU can range from 16×16 to 64×64 in the HEVC main profile (although technically 8×8 CTU sizes can be supported). A coding unit (CU) could be the same size of a CTU or smaller, e.g., 8×8. Each coding unit is coded with one mode. When a CU is inter coded, it may be further partitioned into 2 or 4 prediction units (PUs) or become just one PU when further partition doesn't apply. When two PUs are present in one CU, they can be half size rectangles or two rectangle size with ¼ or ¾ size of the CU. When a CU is inter coded, one set of motion information is present for each PU. In addition, each PU is coded with a unique inter-prediction mode to derive the set of motion information.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

To adapt the various characteristics of the residual blocks, a transform coding structure using the residual quadtree (RQT) is applied in HEVC, which is briefly described in www.hhi.fraunhofer.de/fields-of-competence/image-processing/researchgroups/image-video-coding/hevc-high-efficiency-video-coding/transform-coding-using-the-residual-quadtree-rqt.html.

Figure 4:
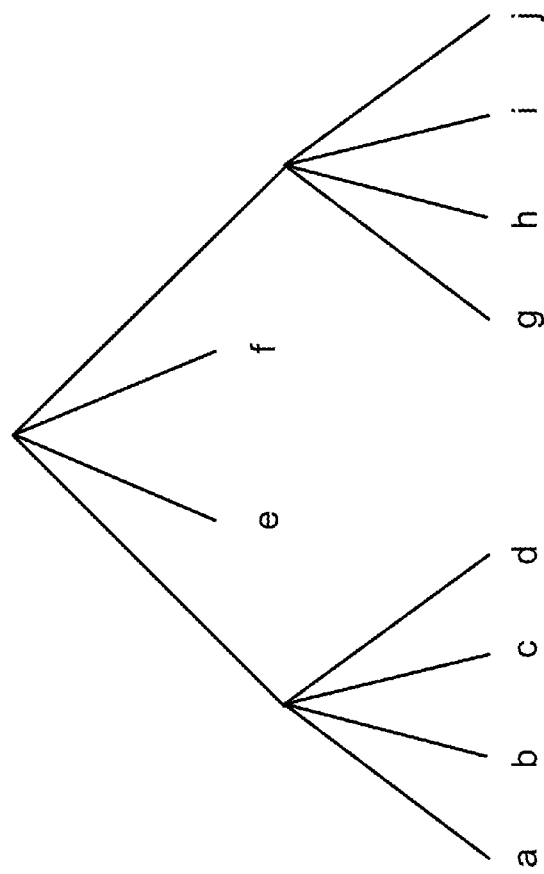
FIG. 4 is a conceptual diagram illustrating an example residual quadtree for a CU that includes 10 TUs, labeled with the letters a to j, and the corresponding block partitioning.
Figure 4:
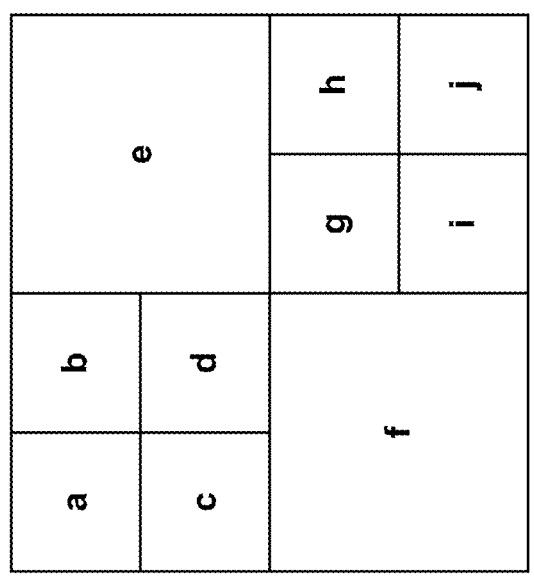

Each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU). The partitioning of a CU into TUs is carried out recursively based on a quadtree approach; therefore, the residual signal of each CU is coded by a tree structure namely, the residual quadtree (RQT). The RQT allows TU sizes from 4×4 up to 32×32 luma samples. FIG. 4 shows an example where a CU includes 10 TUs, labeled with the letters a to j, and the corresponding block partitioning.

Each node of the RQT is actually a transform unit (TU). The individual TUs are processed in depth-first tree traversal order, which is illustrated in the figure as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision, for example based on rate-distortion optimization technique. The rate-distortion optimization technique calculates a weighted sum of coding bits and reconstruction distortion, i.e., the rate-distortion cost, for each coding mode (e.g., a specific RQT splitting structure), and select the coding mode with least rate-distortion cost as the best mode.

Three parameters are defined in the RQT: the maximum depth of the tree, the minimum allowed transform size and the maximum allowed transform size. In HEVC, the minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CTU cannot be split any further if each included TU reaches the maximum allowed transform size, e.g., 32×32. In HEVC, larger size transforms, e.g., 64×64 transform, are not adopted mainly due to its limited benefit considering a relatively high complexity for relatively smaller resolution videos.

A leaf-CU may include one or more prediction units (PUs). In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

CABAC is a method of entropy coding first introduced in H.264/AVC and now used in the newest standard High Efficiency Video Coding (HEVC). It involves three main functions: binarization, context modeling, and arithmetic coding. Binarization maps syntax elements to binary symbols (bins) which are called bin strings. Context modeling estimates the probability of the bins. Finally, binary arithmetic coder compresses the bins to bits based on the estimated probability.

Several different binarization processes are used in HEVC, including unary (U), truncated unary (TU), kth-order Exp-Golomb (EGk), and fixed length (FL). Details are described in the HEVC specification.

Context modeling provides accurate probability estimation which is necessary to achieve high coding efficiency. Accordingly, it is highly adaptive. Different context models can be used for different bins where the probability of the context models is updated based on the values of previously coded bins. Bins with similar distributions often share the same context model. The context model for each bin can be selected based on the type of syntax element, bin position in syntax element (binIdx), luma/chroma, neighboring information, etc.

Context switch occurs after each bin coding. The probability models are stored as 7-bit entries (6 bits for the probability state and 1 bits for the most probable symbol (MPS)) in context memory and addressed using the context index computed by context selection logic.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Figure 5:
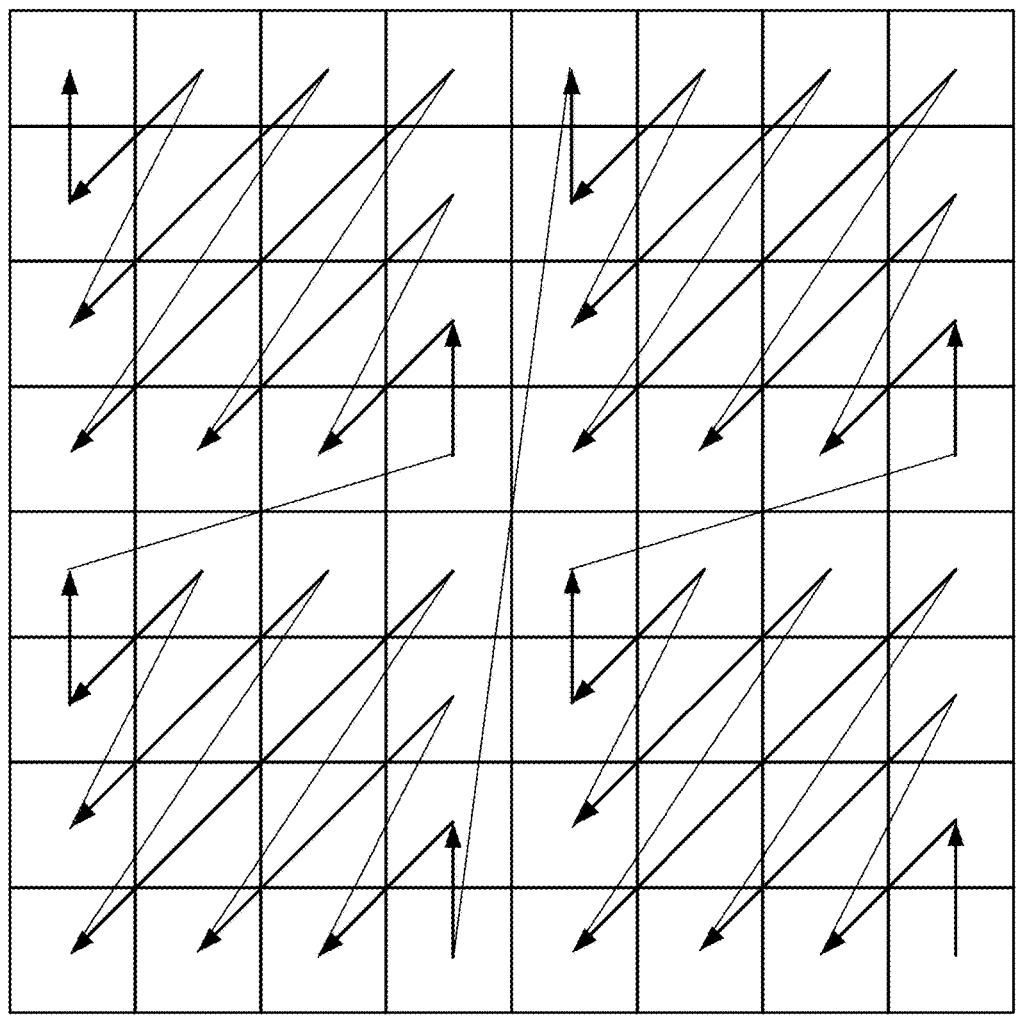
FIG. 5 is a conceptual diagram illustrating a coefficient scan based on coding groups in High Efficiency Video Coding (HEVC).

In HEVC, regardless of the TU size, the residual of the transform unit is coded with non-overlapped coefficient groups (CG), each contains the coefficients of a 4×4 block of a TU. For example, a 32×32 TU has totally 64 CGs, and a 16×16 TU has totally 16 CGs. The CGs inside a TU are coded according to a certain pre-defined scan order. When coding each CG, the coefficients inside the current CG are scanned and coded according to a certain pre-defined scan order for 4×4 block. FIG. 5 illustrates the coefficient scan for an 8×8 TU containing 4 CGs. The syntax element table is defined as follows:

| RESIDUAL CODING SYNTAX | |
|---|---|
| residual_coding( x0, y0, log2TrafoSize, cIdx ) { | Descriptor |
|   if( transform_skip_enabled_flag && !cu_transquant_bypass_flag && <br>    ( log2TrafoSize = = 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |

-continued

| RESIDUAL CODING SYNTAX | |
|---|---|
| residual_coding( x0, y0, log2TrafoSize, cIdx ) { | Descriptor |

```
    lastScanPos = 16
    lastSubBlock = ( 1 << ( log2TrafoSize − 2 ) ) * ( 1 << (
            log2TrafoSize − 2 ) ) − 1
    do {
       if( lastScanPos = = 0 ) {
          lastScanPos = 16
          lastSubBlock− −
       }
       lastScanPos− −
       xS = ScanOrder[ log2TrafoSize − 2 ][ scanIdx ][ lastSubBlock ][ 0 ]
       yS = ScanOrder[ log2TrafoSize − 2 ][ scanIdx ][ lastSubBlock ][ 1 ]
       xC = ( xS << 2 ) + ScanOrder[ 2 ][ scanIdx ][ lastScanPos ][ 0 ]
       yC = ( yS << 2 ) + ScanOrder[ 2 ][ scanIdx ][ lastScanPos ][ 1 ]
    } while( ( xC != LastSignificantCoeffX ) || ( yC !=
            LastSignificantCoeffY ) )
    for( i = lastSubBlock; i >= 0; i− − ) {
       xS = ScanOrder[ log2TrafoSize − 2 ][ scanIdx ][ i ][ 0 ]
       yS = ScanOrder[ log2TrafoSize − 2 ][ scanIdx ][ i ][ 1 ]
       inferSbDcSigCoeffFlag = 0
       if( ( i < lastSubBlock ) && ( i > 0 ) ) {
          coded_sub_block_flag[ xS ][ yS ]                               ae(v)
          inferSbDcSigCoeffFlag = 1
       }
       for( n = ( i = = lastSubBlock ) ? lastScanPos − 1 : 15; n >= 0; n− − ) {
          xC = ( xS << 2 ) + ScanOrder[ 2 ][ scanIdx ][ n ][ 0 ]
          yC = ( yS << 2 ) + ScanOrder[ 2 ][ scanIdx ][ n ][ 1 ]
          if( coded_sub_block_flag[ xS ][ yS ] && ( n > 0 ||
!inferSbDcSigCoeffFlag ) ) {
             sig_coeff_flag[ xC ][ yC ]                                  ae(v)
             if( sig_coeff_flag[ xC ][ yC ] )
                inferSbDcSigCoeffFlag = 0
          }
       }
       firstSigScanPos = 16
       lastSigScanPos = −1
       numGreater1Flag = 0
       lastGreater1ScanPos = −1
       for( n = 15; n >= 0; n− − ) {
          xC = ( xS << 2 ) + ScanOrder[ 2 ][ scanIdx ][ n ][ 0 ]
          yC = ( yS << 2 ) + ScanOrder[ 2 ][ scanIdx ][ n ][ 1 ]
          if( sig_coeff_flag[ xC ][ yC ] ) {
             if( numGreater1Flag < 8 ) {
                coeff_abs_level_greater1_flag[ n ]                       ae(v)
                numGreater1Flag++
                if( coeff_abs_level_greater1_flag[ n ] && lastGreater1ScanPos
= = −1 )
                   lastGreater1ScanPos = n
             }
             if( lastSigScanPos = = −1 )
                lastSigScanPos = n
             firstSigScanPos = n
          }
       }
       signHidden = ( lastSigScanPos − firstSigScanPos > 3 &&
!cu_transquant_bypass_flag )
       if( lastGreater1ScanPos != −1 )
          coeff_abs_level_greater2_flag[ lastGreater1ScanPos ]           ae(v)
       for( n = 15; n >= 0; n− − ) {
          xC = ( xS << 2 ) + ScanOrder[ 2 ][ scanIdx ][ n ][ 0 ]
          yC = ( yS << 2 ) + ScanOrder[ 2 ][ scanIdx ][ n ][ 1 ]
          if( sig_coeff_flag[ xC ][ yC ] &&
             ( !sign_data_hiding_enabled_flag || !signHidden || ( n !=
firstSigScanPos ) ) )
                coeff_sign_flag[ n ]                                     ae(v)
       }
       numSigCoeff = 0
       sumAbsLevel = 0
       for( n = 15; n >= 0; n− − ) {
          xC = ( xS << 2 ) + ScanOrder[ 2 ][ scanIdx ][ n ][ 0 ]
          yC = ( yS << 2 ) + ScanOrder[ 2 ][ scanIdx ][ n ][ 1 ]
          if( sig_coeff_flag[ xC ][ yC ] ) {
             baseLevel = 1 + coeff_abs_level_greater1_flag[ n ] +
                      coeff_abs_level_greater2_flag[ n ]
             if( baseLevel = = ( ( numSigCoeff < 8 ) ?
                   ( (n = = lastGreater1ScanPos) ? 3 : 2 ) : 1 ) )
```

-continued

RESIDUAL CODING SYNTAX

| residual_coding( x0, y0, log2TrafoSize, cIdx ) { | Descriptor |
|---|---|
|         coeff_abs_level_remaining[ n ]<br>        TransCoeffLevel[ x0 ][ y0 ][ cIdx ][ xC ][ yC ] =<br>          ( coeff_abs_level_remaining[ n ] + baseLevel ) * ( 1 − 2 *<br>coeff_sign_flag[ n ] )<br>        if( sign_data_hiding_enabled_flag && signHidden ) {<br>          sumAbsLevel += ( coeff_abs_level_remaining[ n ] + baseLevel )<br>          if( ( n = = firstSigScanPos ) && ( ( sumAbsLevel % 2 ) = = 1 )<br>)<br>            TransCoeffLevel[ x0 ][ y0 ][ cIdx ][ xC ][ yC ] =<br>                −TransCoeffLevel[ x0 ][ y0 ][ cIdx ][ xC ][ yC ]<br>        }<br>        numSigCoeff++<br>      }<br>    }<br>  }<br>} | ae(v) |

For each color component, one flag may be firstly signaled to indicate whether current transform unit has at least one non-zero coefficient. If there is at least one non-zero coefficient, the position of the last significant coefficient in the coefficient scan order in a transform unit is then explicitly coded with a coordination relative to the top-left corner of the transform unit. The vertical or horizontal component of the coordination is represented by its prefix and suffix, wherein the prefix is binarized with truncated rice (TR) and suffix is binarized with fixed length.

Semantics for the syntax elements shown in the table above may be defined as follows:

last_sig_coeff_x_prefix specifies the prefix of the column position of the last significant coefficient in scanning order within a transform block. The values of last_sig_coeff_x_prefix shall be in the range of 0 to (log 2 TrafoSize<<1)−1, inclusive.

last_sig_coeff_y_prefix specifies the prefix of the row position of the last significant coefficient in scanning order within a transform block. The values of last_sig_coeff_y_prefix shall be in the range of 0 to (log 2 TrafoSize<<1)−1, inclusive.

last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1)−1))−1, inclusive.

The column position of the last significant coefficient in scanning order within a transform block LastSignificantCoeffX may be derived as follows:

If last_sig_coeff_x_suffix is not present, the following applies:
    LastSignificantCoeffX=last_sig_coeff_x_prefix
Otherwise (last_sig_coeff_x_suffix is present), the following applies:
    LastSignificantCoeffX=(1<<((last_sig_coeff_x_prefix>>1)−1))*(2+(last_sig_coeff_x_prefix & 1))+last_sig_coeff_x_suffix last_sig_coeff_y_suffix specifies the suffix of the row position of the last significant coefficient in scanning order within a transform block. The values of last_sig_coeff_y_suffix shall be in the range of 0 to (1<<((last_sig_coeff_y_prefix>>1)−1))−1, inclusive.

The row position of the last significant coefficient in scanning order within a transform block LastSignificantCoeffY is derived as follows:

If last_sig_coeff_y_suffix is not present, the following applies:
    LastSignificantCoeffY=last_sig_coeff_y_prefix
Otherwise (last_sig_coeff_y_suffix is present), the following applies:
    LastSignificantCoeffY=(1<<((last_sig_coeff_y_prefix>>1)−1))*(2+(last_sig_coeff_y_prefix & 1))+last_sig_coeff_y_suffix When scanIdx is equal to 2, the coordinates are swapped as follows:
    (LastSignificantCoeffX, LastSignificantCoeffY)=Swap (LastSignificantCoeffX, LastSignificantCoeffY)

With such a position coded and also the coefficient scanning order of the CGs, one flag is further signaled for CGs except the last CG (in scanning order) which indicates whether it contains non-zero coefficients.

When coding whether one CG has non-zero coefficients, i.e., the CG flag (coded_sub_block_flag in the HEVC specification), the information of neighboring CGs are utilized to build the context. To be more specific, the context selection for coding the CG flag is defined as:

(Right CG available && Flag of right CG is equal to 1)||(below CG available && Flag of below CG is equal to 1)

Here, the right and below CG are the two neighboring CGs close to current CG. Details of the derivation of context index increment could be found in 9.3.4.2.4 of the HEVC specification.

For those CGs that may contain non-zero coefficients, significant flags (significant_flag), absolute values of coefficients (including coeff_abs_level_greater1_flag, coeff_abs_level_greater2_flag and coeff_abs_level_remaining) and sign information (coeff_sign_flag) may be further coded for each coefficient according to the pre-defined 4×4 coefficient scan order. The coding of transform coefficient levels is separated into multiple scan passes.

In a first pass of the first bin coding, all the first bins (or the bin index 0, bin0) of transform coefficients at each position within one CG are coded except that it could be derived that the specific transform coefficient is equal to 0. The variable sigCtx depends on the current location relative to the top-left position of current TU, the colour component index cIdx, the transform block size, and previously decoded bins of the syntax element coded_sub_block_flag. Different rules may be applied depending on the TU size. Details of the selection of the context index increment are defined in 9.3.4.2.5 of the HEVC specification.

In HEVC, all the bin0s (the first bins coded during the first pass) are coded during the first coding pass, except the bin0 associated with the last transform coefficient in HEVC. In JEM, the context index calculation for bin0 could be defined as follows:

$$c_0 = \min(\text{sum\_template}(0), 5) + f(x, y, 6, 2) + \delta_k(f(x, y, 6, 5), cIdx) + \text{offset}(cIdx, \text{width})$$

$$c_0 = c_0 + \text{offset}(cIdx, \text{width}) \quad (5)$$

Where $$\text{offset}(v, w) = \begin{cases} w == 4?0:(w == 8?NumberLumaCtxOneset: & v = 0 \\ NumberLumaCtxOneset*2) & v \neq 0 \\ NumberLumaCtxOneset*3 \end{cases}$$

Based on the range of $c_0$, one set of luma contexts include NumberLumaCtxOneset, i.e., 18 context models. Different transform sizes (with the transform width denoted by 'w') for coding luma bin0s has to select its own set. In addition, chroma and luma contexts are separated to further improve the coding performance. For YCbCr inputs, the three color components, i.e., Y, Cb and Cr are represented with component index v equal to 0, 1, and 2, respectively.

In a second pass of the second bin coding, the coding of coeff_abs_level_greater1_flags is applied. The context modeling is dependent on colour component index, the current sub-block scan index, and the current coefficient scan index within the current sub-block. Details of the selection of the context index increment are defined in Section 9.3.4.2.6 of the HEVC specification.

In a third pass of the third bin coding, the coding of coeff_abs_level_greater2_flags is applied. The context modeling is similar to that used by coeff_abs_level_greater1_flags. Details of the selection of the context index increment are defined in Section 9.3.4.2.7 of the HEVC specification.

In order to improve throughput, the second and third passes may not process all the coefficients in a CG. The first eight coeff_abs_level_greater1_flags in a CG are coded in regular mode. After that, the values are left to be coded in bypass mode in the fifth pass by the syntax coeff_abs_level_remaining. Similarly, only the coeff_abs_level_greater2_flags for the first coefficient in a CG with magnitude larger than 1 is coded. The rest of the coefficients with magnitude larger than 1 of the CG use coeff_abs_level_remaining to code the value. This method limits the number of regular bins for coefficient levels to a maximum of 9 per CG: 8 for the coeff_abs_level_greater1_flags and 1 for coeff_abs_level_greater2_flags.

When coding bin1s (that is, the second bins coded during the second coding pass), the values of bin1 associated with coefficients in a local template may be used for context modeling. Similarly, the values of bin2s (that is, the third bins coded during the third coding pass) associated with coefficients in the local template are used to select the context models for coding a current bin2. More specifically: For bin1, the context index is derived as:

$$c_1 = \min(\text{sum\_template}(1), 4) + N$$

$$c_1 = c_1 + \delta_k(f(x, y, 5, 3), cIdx) + \delta_k(f(x, y, 5, 10), cIdx) \quad (6)$$

For bin2, the context index is derived as:

$$c_2 = \min(\text{sum\_template}(2), 4) + N$$

$$c_2 = c_2 + \delta_k(f(x, y, 5, 3), cIdx) + \delta_k(f(x, y, 5, 10), cIdx) \quad (7)$$

where N is equal to 1. The first bin1 or bin2 is coded with the context index $c_1$ or $c_2$ equal to 0 and for other bin1s and bin2s, they are coded following the above equations.

In a last pass, the remaining bins are coded. Let the baseLevel of a coefficient be defined as:

$$\text{baseLevel} = \text{significant\_flag} + \text{coeff\_abs\_level\_greater1\_flag} + \text{coeff\_abs\_level\_greater2\_flag} \quad (1)$$

where a flag has a value of 0 or 1 and is inferred to be 0 if not present. Then, the absolute value of the coefficient is simply:

$$\text{abs CoeffLevel} = \text{baseLevel} + \text{coeff\_abs\_level\_remaining}. \quad (2)$$

coeff_abs_level_remaining is bypass coded, i.e., no contexts are needed.

The syntax element coeff_abs_level_remaining in HEVC indicates the remaining value for the absolute value of a coefficient level (if the value is larger than that coded in previous scan passes for coefficient coding). This syntax is coded in bypass mode in order to increase the throughput. HEVC employs Rice codes for small values and switches to an Exp-Golomb code for larger values, as described in W.-J. Chien, M. Karczewicz, J. Sole, and J. Chen, "On Coefficient Level Remaining Coding", JCTVC-I0487, 9th Joint Collaborative Team on Video Coding (JCT-VC) Meeting, Geneva, Switzerland, April-May 2012.

Context modeling for the remaining bins of the magnitudes of the transform coefficients may be performed as follows. The Rice parameter r is derived as follows. For each scan position, the parameter is set to 0. Then, the sum_absolute_levelMinus1 is compared against a threshold set $t_R = \{3, 9, 21\}$. In other words, the Rice parameter is 0 if the sum_absolute_levelMinus1 falls into the first interval, is 1 if sum_absolute_levelMinus1 falls into the second interval and so on. The derivation of the Rice parameter r is summarized in the following.

$$\text{sum\_absolute\_level} = \sum |x_i| \quad (8)$$

$$\text{sum\_absolute\_levelMinus1} = \sum \delta_j(x_i)$$

$$\text{with } \delta_j(x) = \begin{cases} |x_i| - 1 & |x_i| > 0 \\ 0 & x_i = 0 \end{cases}$$

$$r(x) = \begin{cases} 0 & x \in [0, 3] \\ 1 & x \in [4, 9] \\ 2 & x \in [10, 21] \\ 3 & x > 21 \end{cases}$$

with x=sum_abslolute_levelMinus1.

Video encoder 20 and video decoder 30 may be configured to perform any of a variety of techniques, alone or in any combination, to code sign information for the transform coefficients. For example, video encoder 20 and video decoder 30 may be configured to perform any of the following techniques, alone or in combination.

In accordance with techniques of this disclosure, video encoder 20 and video decoder 30 (which may generally be referred to as "video coders," such that references to a "video coder" may refer to a video encoder or video decoder) may entropy code (i.e., encode or decode) a value for a sign of a transform coefficient using context modeling. That is, video encoder 20 may determine a context model for entropy decoding a value for a sign of a transform coefficient of a block of video data and entropy encode the value for the sign of the transform coefficient using the context model. Similarly, video decoder 30 may determine a context model for entropy decoding a value for a sign of a transform coefficient of a block of video data and entropy encode the value for the sign of the transform coefficient using the context model.

That is, video encoder 20 and video decoder 30 may be configured to code bins of sign information using context models, instead of using bypass mode. Video encoder 20 and video decoder 30 may further be configured to select the context model based on the sign information of one or more neighboring transform coefficients. Video encoder 20 and video decoder 30 may be configured to determine the neighboring transform coefficients as those located in a template. In one example, the template is the same as that used for context modeling in coding the magnitudes of transform coefficients.

Figure 6:
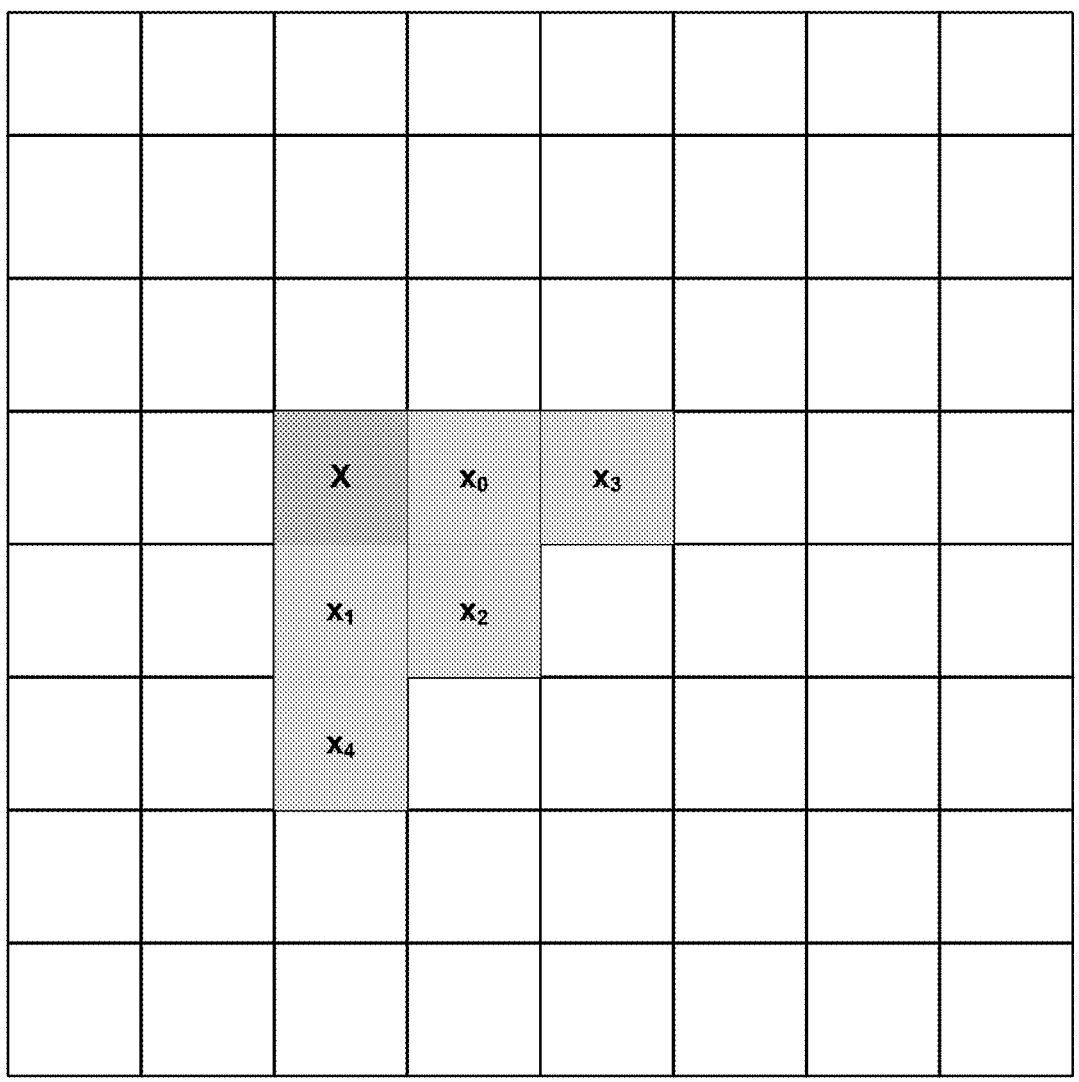
FIG. 6 is a conceptual diagram illustrating an example of a local template that may be used for context modeling.

In another example, the template is the same as that used in VCEG-AZ07 (J. Chen, W.-J. Chien, M. Karczewicz, X. Li, H. Liu, A. Said, L. Zhang, X. Zhao, "Further improvements to HMKTA-1.0", ITU—Telecommunications Standardization Sector STUDY GROUP 16 Question 6 Video Coding Experts Group (VCEG), Doc. VCEG-AZ07, Warsaw, June 2015). That is, in this example, the template covers five neighbors (two from the right side, two from below side and one from bottom-right) within the current transform unit, as depicted in FIG. 6. Alternatively, the neighboring transform coefficients may be located in a spatially or temporally neighboring transform unit.

Alternatively, the template could be different within one coding group/transform unit/one slice/picture/sequence. That is, video encoder 20 and video decoder 30 may be configured to determine which template to use based on which coding group, transform unit, slice, picture, or sequence is being coded. For example, the template may be dependent on the scan order, and/or the intra/inter coding mode, and/or intra prediction modes, and/or transform enabled or not, and/or transform matrices, and/or transform sizes, and/or coding group sizes.

Video encoder 20 and video decoder 30 may be configured to perform the context selection based on a function of the sign information of neighboring transform coefficient(s). In one example, the function is defined as the summation of the sign information of neighboring transform coefficient(s). For example, the function may be defined as:

$$f_0(x_0, x_1, \ldots, x_n) = \sum_{i=0}^{n} (x_i == 0 ? 0 : (x_i > 0 ? 1 : -1))$$

wherein (n+1) denotes the total number of neighboring transform coefficients and $x_i$ denotes the value of the i-th neighboring transform coefficient.

In another example, additionally or alternatively to the examples discussed above, video encoder 20 and video decoder 30 may be configured to perform the context selection is based on the absolute value of the summation, i.e., $$f_1(x_0, x_1, \ldots, x_n) = \text{abs}\left(\sum_{i=0}^{n} (x_i == 0 ? 0 : (x_i > 0 ? 1 : -1))\right)$$

wherein the function abs(•) returns the absolution value.

In some examples, the context selection may additionally or alternatively be dependent on the current magnitude of transform coefficient, transform size, whether the transform is skipped, transform matrices, intra prediction modes, or the like.

Video encoder 20 and video decoder 30 may be configured to determine the bin value for denoting the sign information of one transform coefficient based on both the current transform coefficient and the return value of the function $f_0$ shown above. In one example, when the return value of the function $f_0$, denoted by T, is equal to 0, video encoder 20 and video decoder 30 set the bin value to 1 if current transform coefficient is positive, and otherwise, set the bin value to 0. Alternatively, '1' and '0' may be reversed. Alternatively, video encoder 20 and video decoder 30 may use bypass coding when T is equal to 0.

In another example, when T is not equal to 0, video encoder 20 and video decoder 30 may set variables $S_T$ to Sign(T) and $S_c$ to Sign(level), where the function Sign(x) returns 1 if x is positive and 0 if x is negative and level denotes the current transform coefficient value. Video encoder 20 and video decoder 30 may set the bin value to be coded to ($S_T$ XOR $S_c$), where XOR denotes the exclusive OR operation. Alternatively, video encoder 20 and video decoder 30 may set the bin value to be coded to ($S_T$ XNOR $S_c$), which is equal to (1-($S_T$ XOR $S_c$)). Alternatively, furthermore, video encoder 20 and video decoder 30 may enable this method only when function $f_1$ above is applied.

In some examples, video encoder 20 and video decoder 30 may apply these functions only to certain transform coefficients. For example, video encoder 20 and video decoder 30 may only apply these functions when the sign information of one transform coefficient is not omitted by SDH.

In some examples, video encoder 20 and video decoder 30 may, additionally or alternatively, context code the sign information if the sign information is not omitted, and video encoder 20 and video decoder 30 may perform the context modeling dependent on the sign information of a previous transform coefficient located in the same relative position in one or more neighboring transform units. In one example, neighboring transform units are restricted to be within the current coding unit. The neighboring transform units may be restricted to be those with the same transform size/transform skip flags/transform matrices. Additionally or alternatively, the neighboring transform unit(s) may be from a reference picture.

In one example, when multiple neighboring transform units exist, video encoder 20 and video decoder 30 may use the first previously coded neighboring transform unit to select the context models for current coefficient. Alternatively, video encoder 20 and video decoder 30 may use the first previously coded neighboring transform unit that contains a non-zero coefficient at the same relative position as the current transform coefficient to select the context models for current coefficient. Alternatively, video encoder 20 and video decoder 30 may always use the sign information of the first coded neighboring transform unit (in coding order) for context modeling. Video encoder 20 and video decoder 30 may be configured to perform these techniques only for certain transform coefficients, for example, the DC coefficient for one transform unit.

In some examples, instead of checking the parity of the sum of transform coefficients in a coding group (denoted by $S_{CG}$), i.e., ($S_{CG}$ %2) to derive the omitted sign value, video encoder 20 and video decoder 30 may be configured to apply other rules, such as whether ($S_{CG}$ % N) is equal to K or not, where N may be unequal to 2 and K is from 0 to N−1, inclusive. When ($S_{CG}$ % N) is equal to K, video encoder 20 and video decoder 30 may set the sign value to 0 for representing a positive level (or 1 for representing a negative level). On the contrary, when ($S_{CG}$ % N) is unequal to K, video encoder 20 and video decoder 30 may set the sign value to 1 for representing a negative level (or 0 for representing a positive level). In one example, K is set to 0. In another example, N and/or K could be adaptive within one coding group/transform unit/coding unit/prediction unit/slice/picture/sequence. In another example, N could be decided by the sign information of one or more neighboring transform coefficients. The definition of neighboring transform coefficients may be the same as those discussed above (e.g., according to a template).

In some examples, N may be dependent on the return value of the function $f_0$, as defined above. Denote the return value by $Sum_{NG}$. For example, N is set to 4 when abs($Sum_{NG}$) is larger than a threshold, such as 3; and N is set to 2 when abs($Sum_{NG}$) is larger than a threshold. Alternatively, furthermore, the omitted sign value may be dependent on both $Sum_{NG}$ and whether $S_{CG}$ % N is equal to K. For example, when $Sum_{NG}$ is positive and larger than a threshold, and $S_{CG}$ % N (N is unequal to 2) is equal to K, video encoder 20 and video decoder 30 may set the omitted sign value to 1 for representing a negative level. In another example, when $Sum_{NG}$ is negative and abs($Sum_{NG}$) larger than a threshold, and $S_{CG}$ % N (N is unequal to 2) is equal to K, video encoder 20 and video decoder 30 may set the omitted sign value to 0 for representing a positive level.

In some examples, instead of hiding the sign information of the last non-zero coefficient (in reverse scan order, or in encoding/decoding order) in a coding group, video encoder 20 and video decoder 30 may hide the sign information of the first non-zero coefficient. In one example, video encoder 20 and video decoder 30 may use the same criterion to use SDH as in HEVC design. That is, if the distance in scan order between the first and the last nonzero coefficients of the CG is equal or larger than N (N is set to 4 in this example), video encoder 20 and video decoder 30 may apply SDH. Alternatively, in other examples, different values of N may be used.

Alternatively, or in addition, N could be dependent on the coding group position, prediction modes, and/or transform types. Alternatively, video encoder 20 and video decoder 30 may select different coding groups or transform units to hide the sign information of the first or the last non-zero coefficient. In some examples, SDH may always be disabled for certain coding groups. In some examples, for all coding groups excluding the first coding group (in a reverse scan order), SDH may be disabled. In some examples, when the sign value of the last non-zero coefficient is hidden, and when the techniques discussed above in which video encoder 20 and video decoder 30 determine whether ($S_{CG}$ % N) is unequal to K are also applied, the neighboring pixels may be defined as those located at the left, top, and top-left sides. An example is discussed with respect to FIG. 7 below.

For coefficients belonging to the same frequency, a restriction may be imposed such that all of the coefficients belonging to the same frequency with magnitudes smaller than a threshold, share the same sign value. In one example, the threshold is set to 2. In some examples, only the sign value of the first non-zero coefficient with magnitude smaller than the threshold (in the coding order) is coded and the other sign values are omitted.

The methods related to sign data hiding could also be applied to transform unit-based SDH by replacing coding group by transform unit.

In one example, video encoder 20 and video decoder 30 may be configured to perform the following steps for each coding group, in order:
1. Check whether the first and the last nonzero coefficients of the CG is equal or larger than N (N is set to 4). If yes, the sign information of the last nonzero coefficient (in scan order) which is the first non-zero coefficient (in reverse scan order) is omitted by using SDH.
2. For all non-zero coefficients excluding the first one (in reverse scan order) if omitted, the following steps are performed to select the context model for each non-zero coefficient:
   a. Calculate sum=$\Sigma_{i=0}^{n}(x_i==0?0: (x_i>0?1:-1))$ wherein $x_i$ are the neighboring transform coefficient, as depicted in FIG. 6.
   b. Context modeling based on color components, amplitude of current level and sum value, transform unit (TU) size (equal to 4×4 or not) and transform skip flag (if it is TU4×4). Context index increment (idx) is derived as:
   idx=TU4×4? (TS_Flag+2)*K): (abs Level>1? (K+abs(sum)): abs(sum))
   idx+=(Luma component? 0: K*4)
       wherein K is set to (n+1) and absLevel denotes the absolute value of current transform coefficient level, TS_Flag is set to 1 if current 4×4 transform unit is coded with transform skip mode.
   c. Define current sign flag iCurrSF=level>0?1:0;
       if abs(sum) is equal to 0, code (1−iCurrSF) (probabilities of '1' and '0' are close to be equal)
       Otherwise, code (iCurrSF XOR iTemplateSF) wherein iTemplateSF=sum>0? 1:0

Here, K denotes the total number of neighboring transform coefficients (denoted by n) plus 1. In one example, n is set to 5 and K is set to 6.

Video encoder 20 and video decoder 30 each may be implemented as any of a variety of suitable encoder or decoder digital logic circuitry, as applicable, including fixed function processing circuitry or programmable processing circuitry, or a combination thereof, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
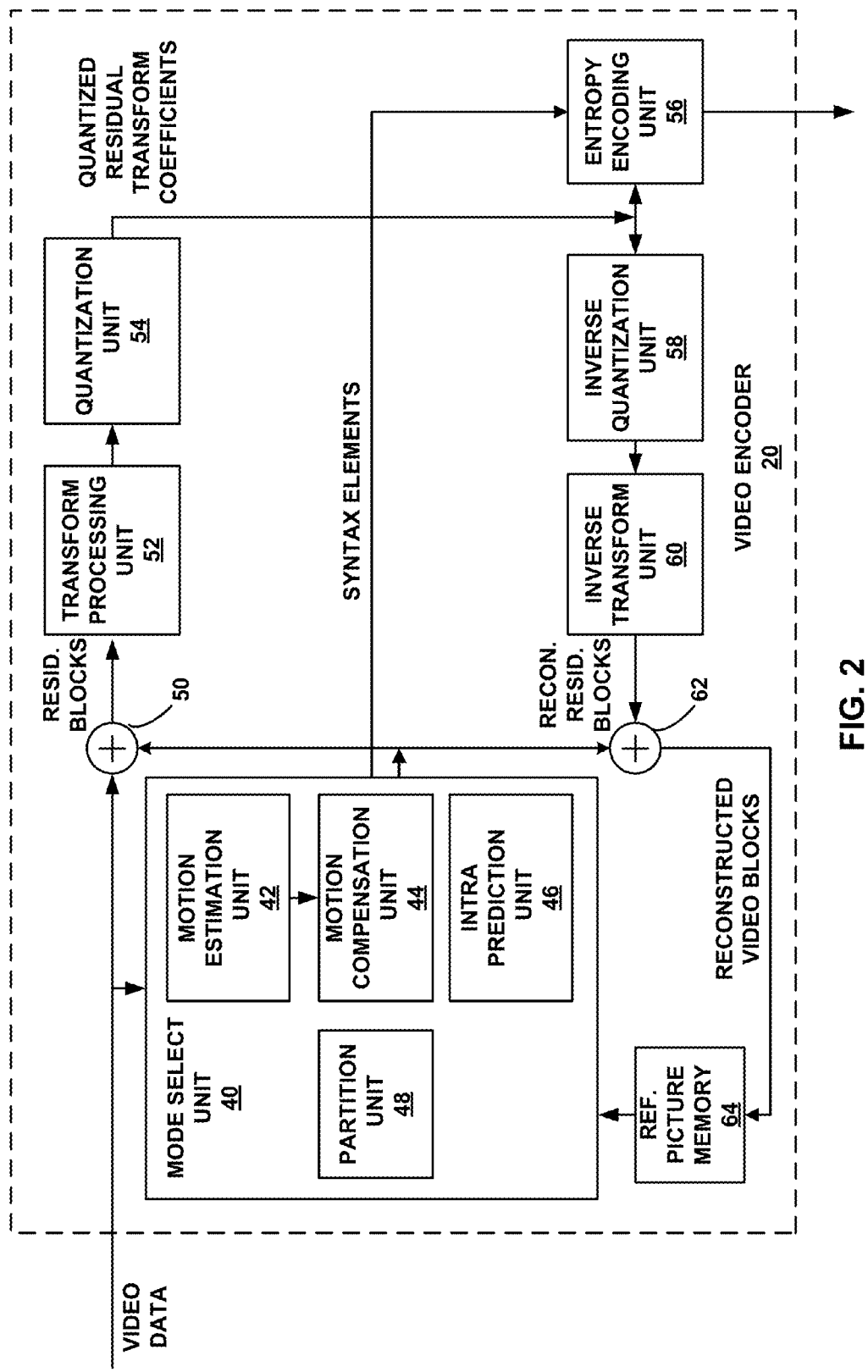
FIG. 2 is a block diagram illustrating an example of a video encoder that may implement techniques for coding sign information of video data.

FIG. 2 is a block diagram illustrating an example of video encoder 20 that may implement techniques for coding sign information of video data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

More particularly, entropy encoding unit 56 may entropy encode values for various transform coefficient syntax elements. Such syntax elements may include, for example, a syntax element indicating whether the transform coefficient has an absolute value greater than zero, a syntax element indicating whether the transform coefficient has an absolute value greater than one, a syntax element indicating whether the transform coefficient has an absolute value greater than two, a syntax element indicating a remainder value for the transform coefficient, and a sign for the transform coefficient. Rather than entropy encoding the value of the syntax element indicating the sign for the transform coefficient using bypass coding, entropy encoding unit 56 may entropy encode the value of the syntax element indicating the sign for the transform coefficient using a context model. This is assuming the sign information for this transform coefficient is not hidden using sign data hiding (SDH) techniques.

In accordance with techniques of this disclosure, entropy encoding unit 56 may determine a context model to use to entropy encode the sign information based on sign values of one or more neighboring transform coefficients. Entropy encoding unit 56 may determine such neighboring transform coefficients using a template, e.g., as discussed in greater detail below with respect to FIG. 6. Entropy encoding unit 56 may select different templates in different circumstances, e.g., based on one or more of a position of the current transform coefficient in a scan order, a prediction mode for a prediction unit corresponding to the transform unit including the current transform coefficient, whether or not transform is enabled, transform matrices applied to the transform unit, a size of the transform unit, or a coding group size for a coding group including the transform coefficient.

In some examples, entropy encoding unit 56 may determine the context model for entropy encoding the sign information using either of functions $f_0$ or $f_1$ as discussed above with respect to FIG. 1.

In some examples, examples entropy encoding unit 56 may avoid entropy encoding a value for sign information of a transform coefficient. For example, entropy encoding unit 56 may perform sign data hiding (SDH) in accordance with the techniques of this disclosure. In some examples, entropy encoding unit 56 may avoid entropy encoding sign information for the transform coefficient when a magnitude of the transform coefficient is smaller than a threshold value, e.g., 2. In some examples, entropy encoding unit 56 may entropy encode sign information for an ordinal first non-zero transform coefficient of a transform unit having a magnitude smaller than a threshold value, e.g., 2, and hide sign values for subsequent transform coefficients of the transform unit.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Entropy encoding unit 56 may further be configured to perform any of the various techniques discussed above with respect to FIG. 1, alone or in any combination.

Video encoder 20 of FIG. 2 represents an example of a video encoder that may be configured to determine a context model for entropy coding a value for a sign of a transform coefficient of a block of video data, and entropy code the value for the sign of the transform coefficient using the context model.

Video encoder 20 also represents an example of a video encoder that may be configured to code data representative of a value of a sign for a transform coefficient using sign data hiding. To code the data, video encoder 20 may code data representing magnitudes of transform coefficients of a coding group that includes the transform coefficient, determine a value, $S_{CG}$, of a sum of the magnitudes of the transform coefficients of the coding group, and determine the sign value based on a determination of whether ($S_{CG}$ % N) is equal to K, wherein N is a value greater than two and K is a value in the range from zero to N−1, inclusive.

Video encoder 20 also represents an example of a video encoder that may be configured to hide sign data for an ordinal first non-zero transform coefficient of a transform unit, and code the first non-zero coefficient.

Figure 3:
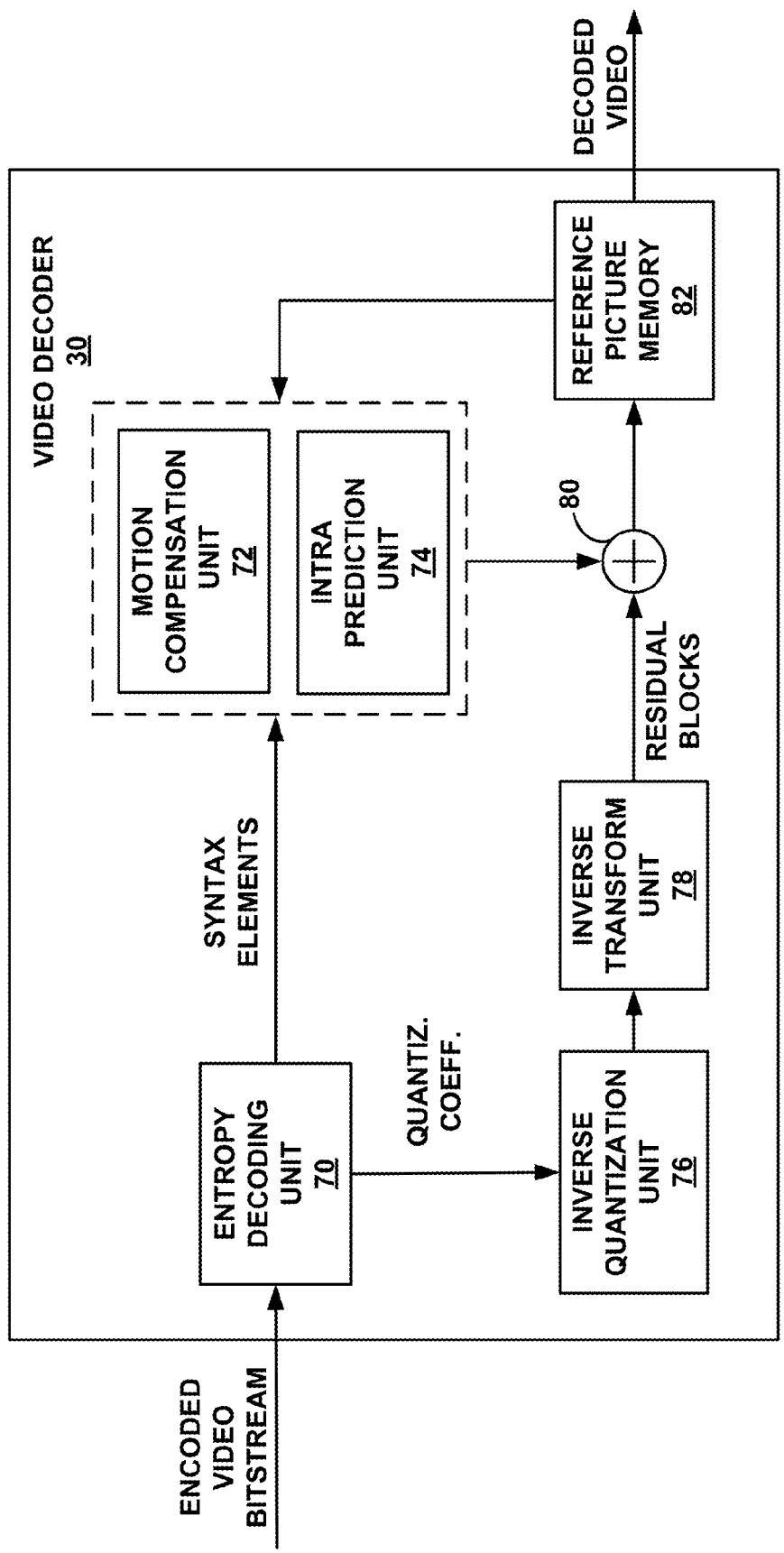
FIG. 3 is a block diagram illustrating an example of a video decoder that may implement techniques for coding sign information of video data.

FIG. 3 is a block diagram illustrating an example of video decoder 30 that may implement techniques for coding sign information of video data. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

More particularly, video decoder 30 may be configured to entropy decode syntax elements for transform coefficients. Such syntax elements may include, for example, a syntax element indicating whether the transform coefficient has an absolute value greater than zero, a syntax element indicating whether the transform coefficient has an absolute value greater than one, a syntax element indicating whether the transform coefficient has an absolute value greater than two, a syntax element indicating a remainder value for the transform coefficient, and a sign for the transform coefficient. Rather than entropy decoding the value of the syntax element indicating the sign for the transform coefficient using bypass coding, entropy decoding unit 70 may entropy decode the value of the syntax element indicating the sign for the transform coefficient using a context model. This is assuming the sign information for this transform coefficient is not hidden using sign data hiding (SDH) techniques.

In accordance with techniques of this disclosure, entropy decoding unit 70 may determine a context model to use to entropy decode the sign information based on sign values of one or more neighboring transform coefficients. Entropy decoding unit 70 may determine such neighboring transform coefficients using a template, e.g., as discussed in greater detail below with respect to FIG. 6. Entropy decoding unit 70 may select different templates in different circumstances, e.g., based on one or more of a position of the current transform coefficient in a scan order, a prediction mode for a prediction unit corresponding to the transform unit including the current transform coefficient, whether or not transform is enabled, transform matrices applied to the transform unit, a size of the transform unit, or a coding group size for a coding group including the transform coefficient.

In some examples, entropy decoding unit 70 may determine the context model for entropy decoding the sign information using either of functions $f_0$ or $f_1$ as discussed above with respect to FIG. 1.

In some examples, examples entropy decoding unit 70 may avoid entropy decoding a value for sign information of a transform coefficient. For example, entropy decoding unit 70 may perform sign data hiding (SDH) in accordance with the techniques of this disclosure. In some examples, entropy decoding unit 70 may avoid entropy decoding sign information for the transform coefficient when a magnitude of the transform coefficient is smaller than a threshold value, e.g., 2. In some examples, entropy decoding unit 70 may entropy decode sign information for an ordinal first non-zero transform coefficient of a transform unit having a magnitude smaller than a threshold value, e.g., 2, and hide sign values for subsequent transform coefficients of the transform unit.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Entropy decoding unit 70 may further be configured to perform any of the various techniques discussed above with respect to FIG. 1, alone or in any combination.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 of FIG. 3 represents an example of a video decoder that may be configured to determine a context model for entropy coding a value for a sign of a transform coefficient of a block of video data, and entropy code the value for the sign of the transform coefficient using the context model.

Video decoder 30 also represents an example of a video decoder that may be configured to code data representative of a value of a sign for a transform coefficient using sign data hiding. To code the data, video decoder 30 may code data representing magnitudes of transform coefficients of a coding group that includes the transform coefficient, determine a value, $S_{CG}$, of a sum of the magnitudes of the transform coefficients of the coding group, and determine the sign value based on a determination of whether ($S_{CG}$ % N) is equal to K, wherein N is a value greater than two and K is a value in the range from zero to N−1, inclusive.

Video decoder 30 also represents an example of a video encoder that may be configured to hide sign data for an ordinal first non-zero transform coefficient of a transform unit, and code the first non-zero coefficient.

FIG. 4 is a conceptual diagram illustrating an example residual quadtree for a CU that includes 10 TUs, labeled with the letters a to j, and the corresponding block partitioning. Video encoder 20 may be configured to encode the TUs, and video decoder 30 may be configured to decode the TUs.

FIG. 5 is a conceptual diagram illustrating a coefficient scan based on coding groups in HEVC. In particular, in this example, the coefficient scan proceeds from the lower-right coefficient to the upper-left coefficient in a zig-zag pattern by coefficient groups. The example of FIG. 5 portrays an 8×8 TU, divided into four 4×4 coefficient groups. The coefficient scan proceeds in the same pattern for each coefficient group, in this example.

FIG. 6 is a conceptual diagram illustrating an example of a local template that may be used for context modeling. In J. Chen, W.-J. Chien, M. Karczewicz, X. Li, H. Liu, A. Said, L. Zhang, X. Zhao, "Further improvements to HMKTA-1.0", ITU-Telecommunications Standardization Sector STUDY GROUP 16 Question 6 Video Coding Experts Group (VCEG), Doc. VCEG-AZ07, Warsaw, June 2015, the context models for the bin0, bin1, bin2 and the Rice parameters are all selected (bin0 is also referred to as significant_flag, bin1 and bin2 are also referred to as coeff_abs_greater1_flag and coeff_abs_greater2_flag) based on corresponding values located in the local template.

An example of the local template is given in FIG. 6. For an 8×8 transform block, X denotes the coefficient located at the current scan position and $x_i$ with i∈[0,4] denotes the neighbors covered by the local template.

To be more specific, in one example, the function sum_template(k) may return the number of coefficients in a template having magnitudes larger than k, which may be defined as:

$$\text{sum\_template}(k) = \sum \delta_j(x_i, k) \quad (3)$$

$$\text{with } \delta_j(x, k) = \begin{cases} 1 & |x_i| > k \\ 0 & x_i = 0 \end{cases}$$

and functions $f(x, y, n, t)$ may handle the position information and $\delta_k(u,v)$ may handle the component information as follows:

$$f(x, y, n, t) = \begin{cases} n & x + y < t \\ 0 & x + y \geq t \end{cases} \quad (4)$$

$$\delta_k(u, v) = \begin{cases} u & v = 0 \\ 0 & v \neq 0 \end{cases}$$

In some examples, if one of the following conditions is satisfied, video encoder 20 and/or video decoder 30 may mark $x_i$ as unavailable and not used in the context index derivation process for deriving a context model to be used to entropy code sign information for a current transform coefficient:

Position of $x_i$ and current transform coefficient X are not located in the same transform unit;

Position of $x_i$ is located out of picture horizontal or vertical boundary; or

The transform coefficient $x_i$ has not yet been encoded/decoded.

Figure 7:
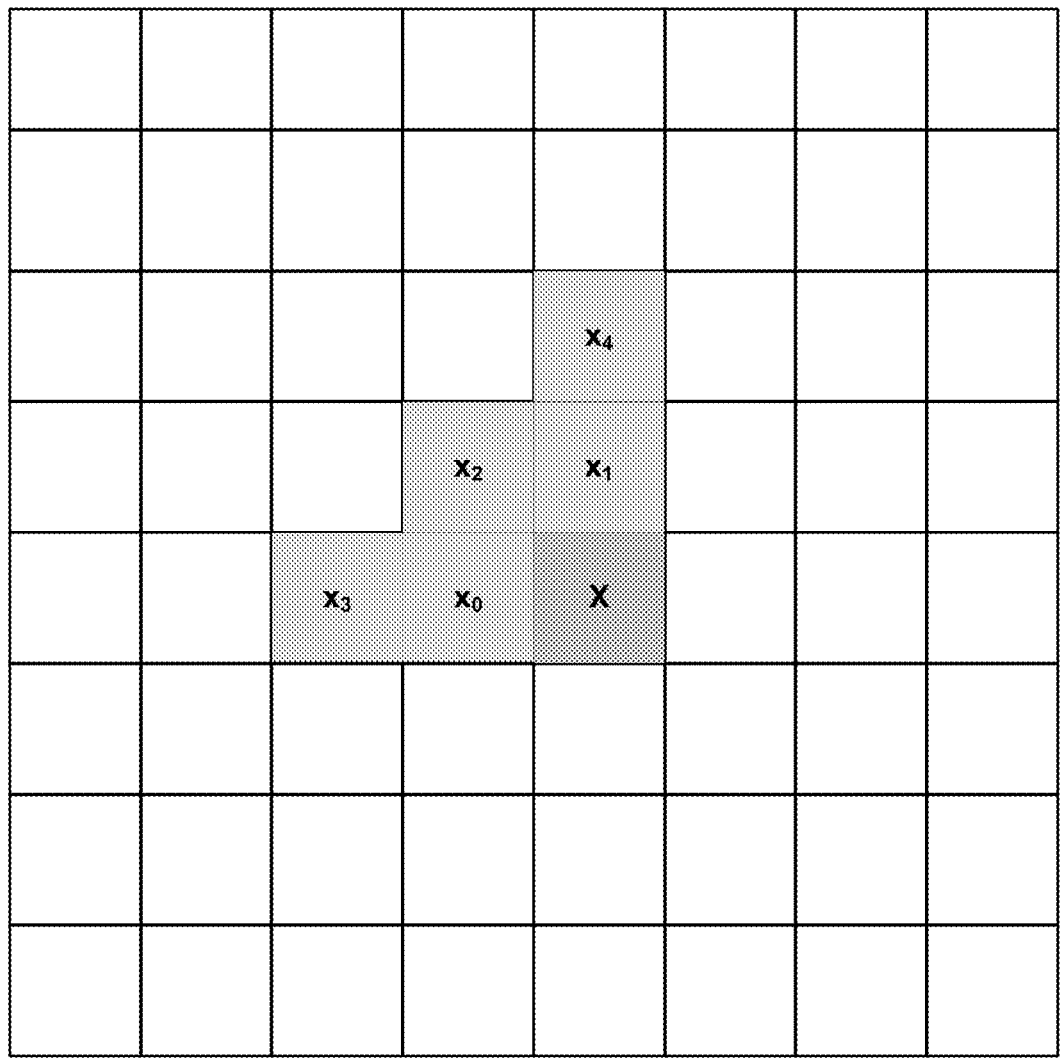
FIG. 7 is a conceptual diagram illustrating an example local template that may be used during sign data hiding (SDH).

FIG. 7 is a conceptual diagram illustrating an example local template that may be used during sign data hiding (SDH).

Figure 8:
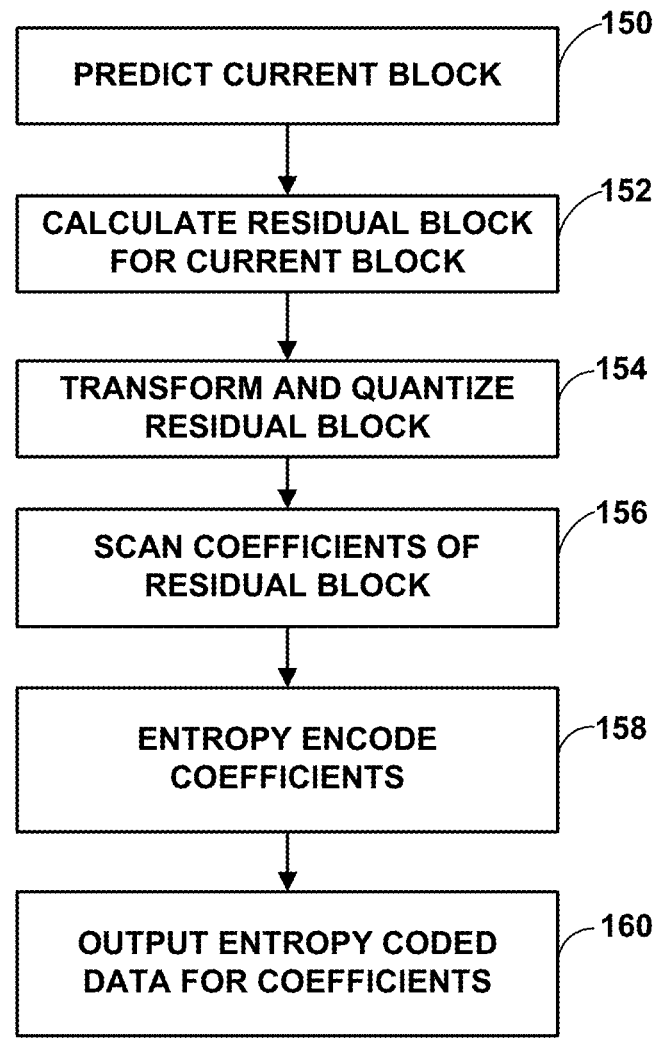
FIG. 8 is a flowchart illustrating an example method for encoding a current block.

FIG. 8 is a flowchart illustrating an example method for encoding a current block. The current block may comprise a current CU or a portion of the current CU. Although described with respect to video encoder 20 (FIGS. 1 and 2), it should be understood that other devices may be configured to perform a method similar to that of FIG. 8.

In this example, video encoder 20 initially predicts the current block (150). For example, video encoder 20 may calculate one or more prediction units (PUs) for the current block. Video encoder 20 may then calculate a residual block for the current block, e.g., to produce a transform unit (TU) (152). To calculate the residual block, video encoder 20 may calculate a difference between the original, uncoded block and the predicted block for the current block. Video encoder 20 may then transform the residual block to produce transform coefficients, and quantize the transform coefficients of the residual block (154). Next, video encoder 20 may scan the quantized transform coefficients of the residual block (156).

During the scan, or following the scan, video encoder 20 may entropy encode the coefficients (158). For example, video encoder 20 may encode the coefficients using CABAC. In particular, in accordance with the techniques of this disclosure, entropy encoding unit 56 of video encoder 20 may encode magnitude information and sign information of each coefficient of the quantized transform coefficients. For example, entropy encoding unit 56 may perform any of the various techniques discussed above, alone or in any combination, for entropy coding sign and/or magnitude information.

Video encoder 20 may then output the entropy coded data of the block (160).

Figure 9:
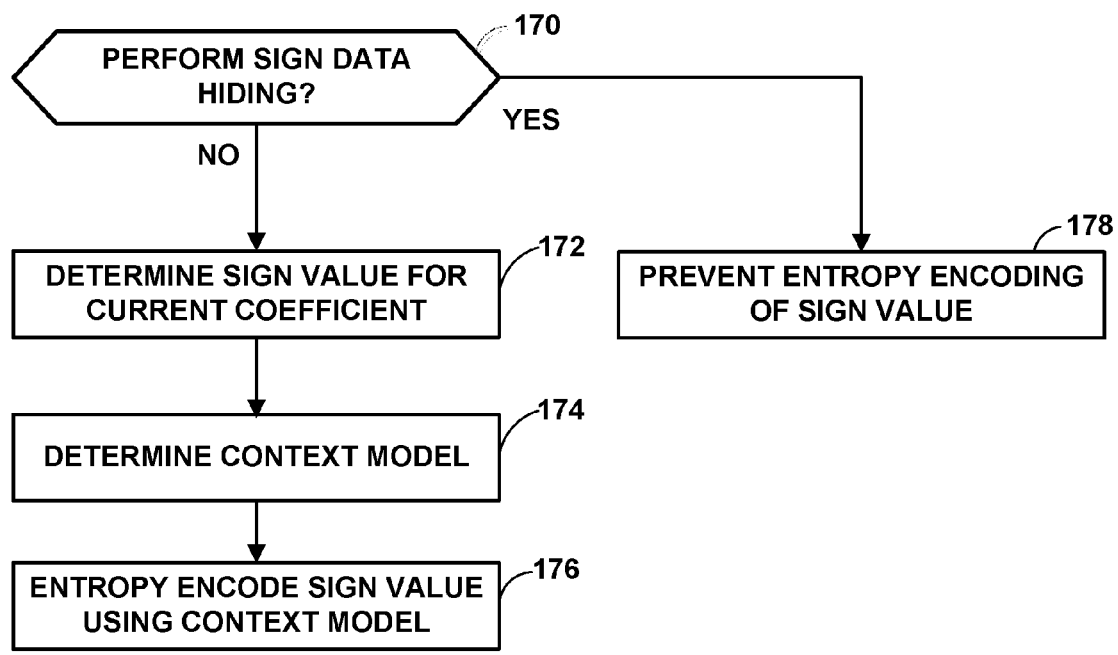
FIG. 9 is a flowchart illustrating an example method for entropy encoding sign information in accordance with the techniques of this disclosure.

FIG. 9 is a flowchart illustrating an example method for entropy encoding sign information in accordance with the techniques of this disclosure. The method of FIG. 9 may correspond to at least part of step 158 of FIG. 8. In this example, entropy encoding unit 56 (FIG. 2) may initially determine whether to perform sign data hiding (SDH) for a sign value of a current transform coefficient (170). For example, entropy encoding unit 56 may determine whether to perform SDH based on execution of either or both of functions $f_0$ and/or $f_1$, as discussed above. If entropy encoding unit 56 determines to perform SDH for the current transform coefficient ("YES" branch of 170), entropy encoding unit 56 may prevent entropy encoding of the sign value (178). Furthermore, although not shown in FIG. 9, entropy encoding unit 56 may further manipulate data of one or more other transform coefficients to represent the sign value of the current transform coefficient, e.g., by modifying one or more magnitude values of transform coefficients in the same coefficient group such that the sign value is recoverable from the parity of bits in the coefficient group.

On the other hand, if entropy encoding unit 56 determines not to perform SDH for the current transform coefficient ("NO" branch of 170), entropy encoding unit 56 may determine a sign value for the current coefficient (172). Entropy encoding unit 56 may then determine a context model to use to entropy encode the sign value (174). For example, as discussed above, entropy encoding unit 56 may determine the context model according to a template. Moreover, entropy encoding unit 56 may select the template based on, e.g., a scan order, a prediction mode, whether or not transform is enabled, transform matrices, transform size, or coding group sizes. Alternatively, entropy encoding unit 56 may determine the context model for the current transform coefficient based on sign values for one or more previous transform coefficients that are collocated with the current transform coefficient in one or more neighboring transform units to a current transform unit including the current transform coefficient. Entropy encoding unit 56 may then entropy encode the sign value using the context model (176).

In this manner, the method of FIG. 9 represents an example of a method of encoding vide data including determining a context model for entropy encoding a value for a sign of a transform coefficient of a block of video data, and entropy encoding the value for the sign of the transform coefficient using the context model.

Figure 10:
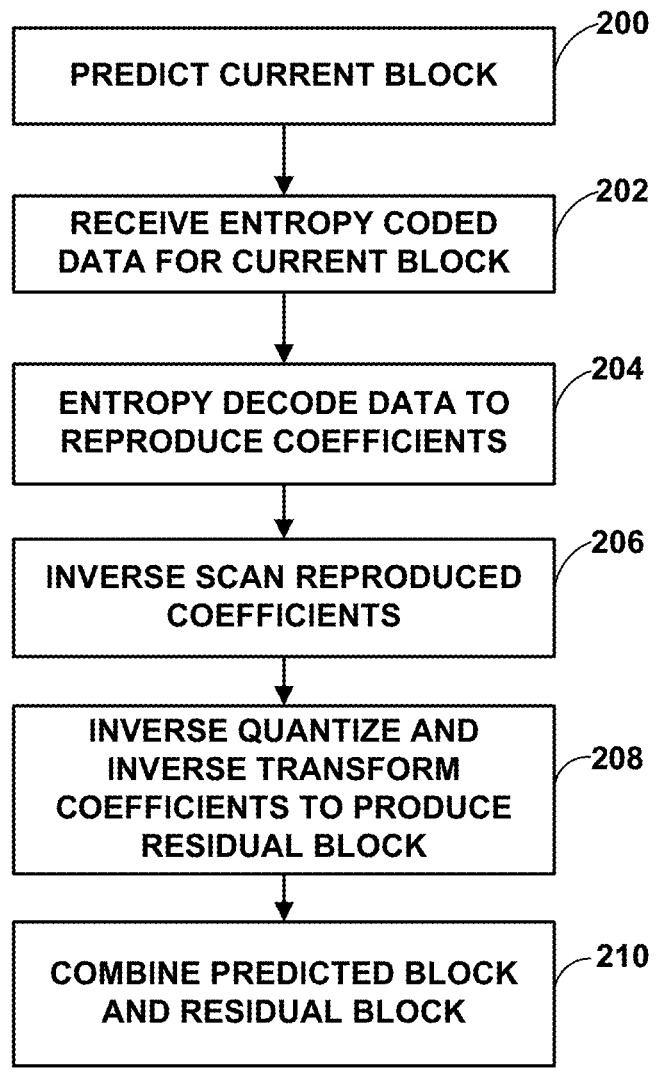
FIG. 10 is a flowchart illustrating an example method for decoding a current block of video data.

FIG. 10 is a flowchart illustrating an example method for decoding a current block of video data. The current block may comprise a current CU or a portion of the current CU. Although described with respect to video decoder 30 (FIGS. 1 and 3), it should be understood that other devices may be configured to perform a method similar to that of FIG. 10.

Video decoder 30 may predict the current block (200), e.g., using an intra- or inter-prediction mode to calculate a predicted block for the current block. Video decoder 30 may also receive entropy coded data for the current block, such as entropy coded data for coefficients of a residual block corresponding to the current block (202).

Video decoder 30 may entropy decode the entropy coded data to reproduce coefficients of the residual block (204). In particular, in accordance with the techniques of this disclosure, entropy decoding unit 70 of video decoder 30 may decode magnitude information and sign information of each coefficient of the quantized transform coefficients. For example, entropy decoding unit 70 may perform any of the various techniques discussed above, alone or in any combination, for entropy coding sign and/or magnitude information.

Video decoder 30 may then inverse scan the reproduced coefficients (206), to create a block of quantized transform coefficients. Video decoder 30 may then inverse quantize and inverse transform the coefficients to produce a residual block (208). Video decoder 30 may ultimately decode the current block by combining the predicted block and the residual block (210).

Figure 11:
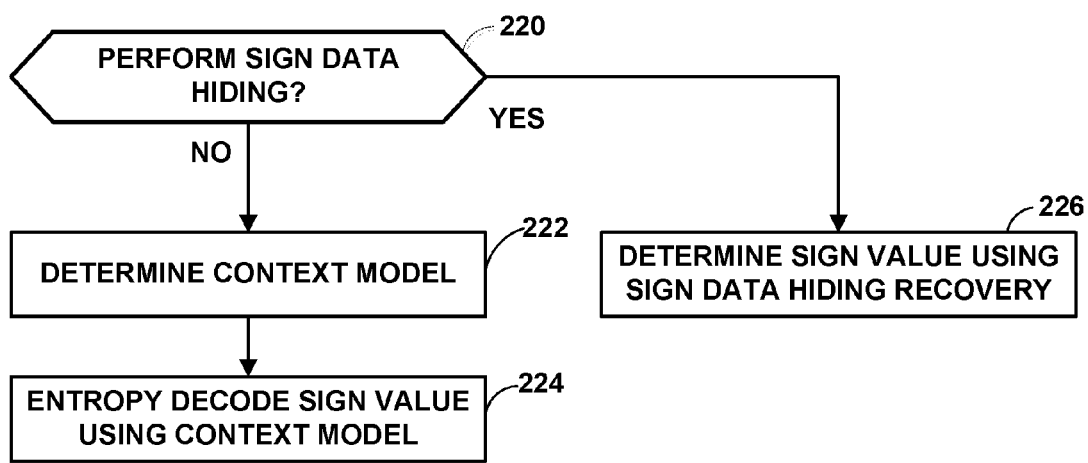
FIG. 11 is a flowchart illustrating an example method for entropy decoding sign information in accordance with the techniques of this disclosure.

FIG. 11 is a flowchart illustrating an example method for entropy decoding sign information in accordance with the techniques of this disclosure. The method of FIG. 11 may correspond to at least part of step 204 of FIG. 10. In this example, entropy decoding unit 70 (FIG. 3) may initially determine whether to perform sign data hiding (SDH) for a sign value of a current transform coefficient (220). For example, entropy decoding unit 70 may determine whether to perform SDH based on execution of either or both of functions $f_0$ and/or $f_1$, as discussed above. If entropy decoding unit 70 determines to perform SDH for the current transform coefficient ("YES" branch of 220), entropy decoding unit 70 may recover a sign value for the sign of the current transform coefficient using sign data hiding recovery techniques (226). For example, entropy decoding unit 70 may recover the sign value from the parity of bits in a coefficient group including the current transform coefficient, as discussed above.

On the other hand, if entropy decoding unit 70 determines not to perform SDH for the current transform coefficient ("NO" branch of 220), entropy decoding unit 70 may determine a context model to use to entropy decode the sign value (222). For example, as discussed above, entropy decoding unit 70 may determine the context model according to a template. Moreover, entropy decoding unit 70 may select the template based on, e.g., a scan order, a prediction mode, whether or not transform is enabled, transform matrices, transform size, or coding group sizes. Alternatively, entropy decoding unit 70 may determine the context model for the current transform coefficient based on sign values for one or more previous transform coefficients that are collocated with the current transform coefficient in one or more neighboring transform units to a current transform unit including the current transform coefficient. Entropy decoding unit 70 may then entropy decode the sign value using the context model (224).

In this manner, the method of FIG. 11 represents an example of a method of decoding vide data including determining a context model for entropy decoding a value for a sign of a transform coefficient of a block of video data, and entropy decoding the value for the sign of the transform coefficient using the context model.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a context model for entropy decoding a value for a sign of a transform coefficient of a block of video data based on one or more sign values of neighboring transform coefficients, wherein the value for the sign indicates whether the transform coefficient is positive or negative, and wherein the context model indicates that probabilities of the transform coefficient being positive or negative are not equal;
   entropy decoding the value for the sign of the transform coefficient using the context model;
   determining the value for the sign of the transform coefficient based on the value of the function wherein (n+1) represents the total number of neighboring transform coefficients and xi represents the $i^{th}$ neighboring transform coefficient;
   inverse transforming the transform coefficient, using the value for the sign of the transform coefficient, and the neighboring transform coefficients to produce a residual block for the block;
   generating a prediction block for the block; and
   combining the prediction block and the residual block to decode the block.

2. The method of claim 1, further comprising determining the one or more neighboring transform coefficients according to a template.

3. The method of claim 2, wherein the template defines the neighboring transform coefficients as including two transform coefficients to the right of the transform coefficient, two transform coefficients below the transform coefficient, and a transform coefficient to the bottom-right of the transform coefficient.

4. The method of claim 2, further comprising determining the context model for entropy decoding a magnitude of the transform coefficient based on magnitudes of the neighboring transform coefficients according to the template.

5. The method of claim 2, further comprising selecting the template based on one or more of a scan order, a prediction mode, whether or not transform is enabled, transform matrices, transform size, or coding group sizes.

6. The method of claim 2, wherein determining the context model comprises determining the context model based on a function representing a sum of the values for the signs of the neighboring transform coefficients.

7. The method of claim 6, wherein the function comprises $$f_0(x_0, x_1, \ldots, x_n) = \sum_{i=0}^{n} (x_i == 0 ? 0 : (x_i > 0 ? 1 : -1)),$$

wherein (n+1) represents the total number of neighboring transform coefficients and $x_i$ represents the $i^{th}$ neighboring transform coefficient.

8. The method of claim 6, wherein the function comprises $$f_1(x_0, x_1, \ldots, x_n) = \text{abs}\left(\sum_{i=0}^{n} (x_i == 0 ? 0 : (x_i > 0 ? 1 : -1))\right),$$

wherein abs(n) returns the absolute value of n, wherein (n+1) represents the total number of neighboring transform coefficients, and xi represents the $i^{th}$ neighboring transform coefficient.

9. The method of claim 1, wherein determining the context model comprises determining the context model based on at least one of a magnitude of the transform coefficient, a size of a transform unit including the transform coefficients, whether a transform is skipped, transform matrices, or a prediction mode for the block.

10. The method of claim 1, wherein the transform coefficient comprises a transform coefficient for which the sign is not hidden by a sign data hiding (SDH) operation.

11. The method of claim 1, wherein the transform coefficient comprises a current transform coefficient at a current position of a current transform unit, and wherein determining the context model comprises determining the context model based on a value for a sign of a previous transform coefficient at a position of a neighboring transform unit to the current transform unit that corresponds to the current position of the current transform unit.

12. The method of claim 1, wherein the transform coefficient comprises a first transform coefficient, the method further comprising determining a value of a second sign for a second transform coefficient based on a frequency for the second transform coefficient when a magnitude of the second transform coefficient is smaller than a threshold value.

13. The method of claim 12, wherein the threshold value is equal to two.

14. The method of claim 12, further comprising decoding a sign value for an ordinal first non-zero transform coefficient having a magnitude smaller than the threshold value, and hiding sign values for other transform coefficients.

15. A device for decoding video data, the device comprising:
a memory configured to store video data; and
one or more processors implemented using digital logic circuitry, the processors configured to:
determine a context model for entropy decoding a value for a sign of a transform coefficient of a block of the video data based on one or more sign values of neighboring transform coefficients, wherein the value for the sign indicates whether the transform coefficient is positive or negative, and wherein the context model indicates that probabilities of the transform coefficient being positive or negative are not equal;
entropy decode the value for the sign of the transform coefficient using the context model;
determine the value for the sign of the transform coefficient based on the value of the function
wherein (n+1) represents the total number of neighboring transform coefficients and $x_i$ represents the $i^{th}$ neighboring transform coefficient;
inverse transform the transform coefficient, using the value for the sign of the transform coefficient, and the neighboring transform coefficients to produce a residual block for the block;
generate a prediction block for the block; and
combine the prediction block and the residual block to decode the block.

16. The device of claim 15, wherein the processors are configured to determine the one or more neighboring transform coefficients according to a template.

17. The device of claim 16, wherein the template defines the neighboring transform coefficients as including two transform coefficients to the right of the transform coefficient, two transform coefficients below the transform coefficient, and a transform coefficient to the bottom-right of the transform coefficient.

18. The device of claim 15, wherein the transform coefficient comprises a current transform coefficient at a current position of a current transform unit, and wherein the processors are configured to determine the context model based on a value for a sign of a previous transform coefficient at a position of a neighboring transform unit to the current transform unit that corresponds to the current position of the current transform unit.

19. The device of claim 15, wherein the transform coefficient comprises a transform coefficient for which the sign is not hidden by a sign data hiding (SDH) operation.

20. The device of claim 15, wherein the transform coefficient comprises a first transform coefficient, and wherein the processors are further configured to determine a value of a second sign for a second transform coefficient based on a frequency for the second transform coefficient when a magnitude of the second transform coefficient is smaller than a threshold value.

21. A device for encoding video data, the device comprising:
means for determining a context model for entropy encoding a value for a sign of a transform coefficient of a block of video data based on one or more sign values of neighboring transform coefficients, wherein the value for the sign indicates whether the transform coefficient is positive or negative, and wherein the context model indicates that probabilities of the transform coefficient being positive or negative are not equal;
means for entropy encoding the value for the sign of the transform coefficient using the context model;
means for determining the value for the sign of the transform coefficient based on the value of the function
wherein (n+1) represents the total number of neighboring transform coefficients and $x_i$ represents the $i^{th}$ neighboring transform coefficient;
means for inverse transforming the transform coefficient, using the value for the sign of the transform coefficient, and the neighboring transform coefficients to produce a residual block for the block;
means for generating a prediction block for the block; and
means for combining the prediction block and the residual block to decode the block.

22. The device of claim 21, further comprising means for determining the one or more neighboring transform coefficients according to a template.

23. The device of claim 21, wherein the transform coefficient comprises a current transform coefficient at a current position of a current transform unit, further comprising means for determining the context model based on a value for a sign of a previous transform coefficient at a position of a neighboring transform unit to the current transform unit that corresponds to the current position of the current transform unit.

24. The device of claim 21, wherein the transform coefficient comprises a first transform coefficient, further comprising means for determining a value of a second sign for a second transform coefficient based on a frequency for the second transform coefficient when a magnitude of the second transform coefficient is smaller than a threshold value.

25. A non-transitory computer-readable storage medium having stored thereon instructions that, when executed, cause a processor to:
determine a context model for entropy decoding a value for a sign of a transform coefficient of a block of the video data based on one or more sign values of neighboring transform coefficients, wherein the value for the sign indicates whether the transform coefficient is positive or negative, and wherein the context model indicates that probabilities of the transform coefficient being positive or negative are not equal;

entropy decode the value for the sign of the transform coefficient using the context model;

determine the value for the sign of the transform coefficient based on the value of the function wherein (n+1) represents the total number of neighboring transform coefficients and $x_i$ represents the $i^{th}$ neighboring transform coefficient;

inverse transform the transform coefficient, using the value for the sign of the transform coefficient, and the neighboring transform coefficients to produce a residual block for the block;

generate a prediction block for the block; and combine the prediction block and the residual block to decode the block.

26. The non-transitory computer-readable storage medium of claim 25, further comprising instructions that cause the processor to determine the one or more neighboring transform coefficients according to a template.

27. The non-transitory computer-readable storage medium of claim 25, wherein the transform coefficient comprises a current transform coefficient at a current position of a current transform unit, further comprising instructions that cause the processor to determine the context model based on a value for a sign of a previous transform coefficient at a position of a neighboring transform unit to the current transform unit that corresponds to the current position of the current transform unit.

28. The non-transitory computer-readable storage medium of claim 25, wherein the transform coefficient comprises a transform coefficient for which the sign is not hidden by a sign data hiding (SDH) operation.

29. The non-transitory computer-readable storage medium of claim 25, wherein the transform coefficient comprises a first transform coefficient, further comprising instructions that cause the processor to determine a value of a second sign for a second transform coefficient based on a frequency for the second transform coefficient when a magnitude of the second transform coefficient is smaller than a threshold value.

* * * * *